United States Patent Office 2,904,921
Patented Sept. 22, 1959

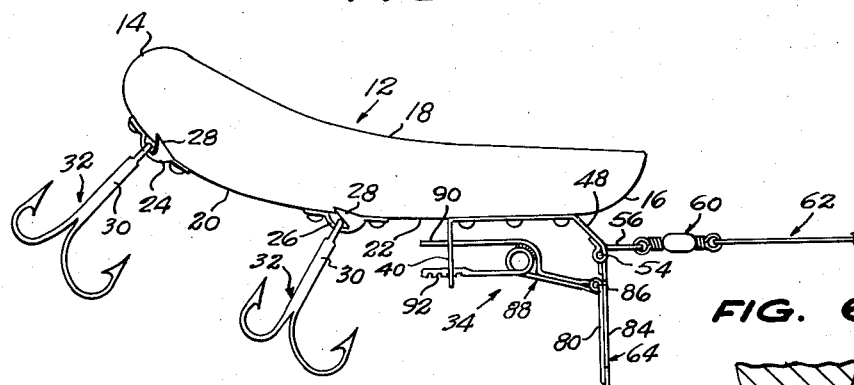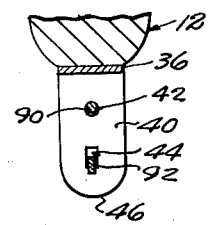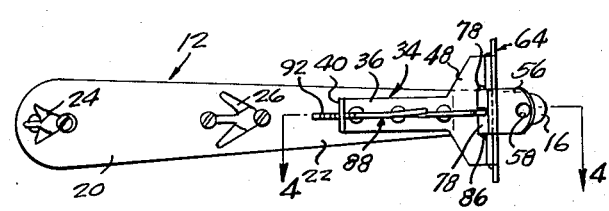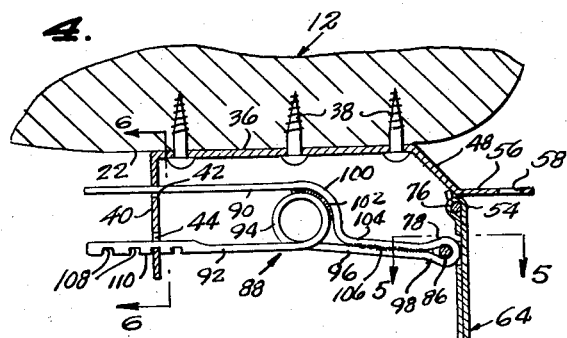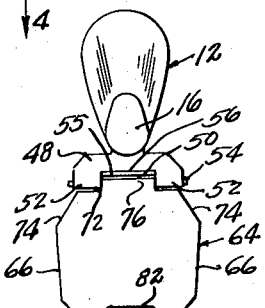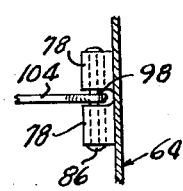

2,904,921

ARTIFICIAL FISH LURE WITH ADJUSTABLE WATERFOIL

Bryan G. Purgason and Billie L. Purgason, Orangevale, Calif.

Application January 16, 1959, Serial No. 787,188

6 Claims. (Cl. 43—42.22)

This invention relates to improvements in artificial fish lures having adjustable means for varying their motion through water, and more particularly to a novel and improved lure of this kind which involves a novel and improved waterfoil assembly which has a waterfoil which is adjustable to positions between forwardly declining and rearwardly declining angles relative to the body.

The primary object of the invention is to provide a more practical, efficient, and versatile lure of the character indicated above whose waterfoil assembly is attached to the underside of the body of the lure, and has a depending waterfoil which is releasably securable by reliable and easily operated retaining means of simple form, in anyone of a plurality of forwardly and rearwardly angulated positions relative to the length of and the underside of the body, so as to cause the lure to dive, surface, and jump when drawn through the water, in fish-attracting simulations of movements of live bait.

Another object of the invention is to provide an adjustable waterfoil assembly of the character indicated above which is secured to a lure body which is formed to functionally cooperate with the asembly for producing unusually active fish-attracting motions in water, or which can be readily attached to other forms of lure bodies.

A further object of the invention is to provide a waterfoil assembly of the character indicated above, which is composed of a small number of simple and inexpensive but sturdy parts, which are easily assembled, and which includes spring pressed positioning and retaining means for the waterfoil which is constricted to resist displacement out of adjusted positions by any means expected to be encountered in actual use of a lure, but which can be easily released and adjusted by hand.

Other important objects and advantageous features of the invention will be apparent from the following description and the accompanying drawings, wherein, for purposes of illustration only, a specific form of the invention is set forth in detail.

In the drawings:

Figure 1 is a left-hand side elevation of a lure of the invention, showing a fishing lure attached in trailing relation thereto, the waterfoil being in an intermediate adjusted position;

Figure 2 is a bottom plan view of Figure 1;

Figure 3 is a right-hand end elevation of Figure 1;

Figure 4 is an enlarged fragmentary vertical longitudinal section, taken on the line 4—4 of Figure 2;

Figure 5 is an enlarged fragmentary horizontal section taken on the line 5—5 of Figure 4; and Figure 6 is a fragmentary vertical transverse section taken on the line 6—6 of Figure 4.

Referring in detail to the drawings, wherein like numerals designate like parts throughout the several views, the illustrated lure comprises an elongated, preferably solid buoyant body 12 which tapers rearwardly from its bulbous hemispherical forward end 14 to its flattened and under-curved rear end 16. The body 12 has a longitudinally curved upper side or top 18 and an underside or bottom which is composed of an upwardly curved forward portion 20 and a substantially flat horizontal rear portion 22. Spaced along and secured to the forward portion 20 are fishhook mounting fittings 24 and 26, which have stop means 28 which prevent shanks 30 of fishhooks 32 from swinging rearwardly to interfere with the waterfoil assembly 34, which is located on the flat rear portion 22.

The water foil assembly 34 comprises a flat, longitudinally elongated base or mounting plate 36, which is shorter than the rear body bottom portion 22 and is displaced toward the rear end thereof, and is secured in engagement with the portion 22, by suitable means, such as screws 38 which traverse the plate 36 and are threaded upwardly into the body 12. On the forward end of the plate 36 is a fixed depending right angular flat arm 40, which is preferably narrower than the body 12, so as to present minimal water resistance, and which constitutes a combined guide and detent arm. At vertically spaced points, located between the upper and lower ends of the arm 40 is a guide hole 42 and a detent hole 44, the latter being rectangular and vertically elongated, as seen in Figure 6. The lower end of the arm 40 is preferably harmlessly rounded, as indicated at 46.

On the rear end of the plate 36 is a fixed fan-shaped, flat, and rearwardly flaring and downwardly and rearwardly declining upper waterfoil element 48, which is preferably wider than the plate 36 and wider than the lure body 12, and which has a wide and depressed rear edge 50, on which are secured two transversely spaced and depending hinge barrels 52 between and through which securably extends a hinge pin 54 which extends freely in the notch 55 defined by the edge 50 and the barrels 52. Fixed on the edge 50 between the barrels 52 and extending horizontally and rearwardly from the waterfoil element 48 is a fishing line attaching lug 56 which has a hole 58 through which an eye of a swivel 60 is adapted to be engaged to secure a fishing line 62 to the lure.

A main and lower waterfoil element 64 is in the form of a flat vertical plate, which is of generally rectangular form and is wider than the upper waterfoil element 48. The main water foil element 64 has parallel side edges 66, a bottom edge 68 which is indented by a central notch 70, and an upper edge 72 which is narrower than and is centered with respect to the element 64, and toward whose ends upper portions of the side edges 66 slant, as indication at 74.

Fixed on and upstanding centrally on the upper edge 72 is a single hinge barrel 76 which is journaled on the hinge pin 54 between the hinge barrels 52 on the upper waterfoil element 48, whereby the lower main waterfoil element 64 is freely swingable forwardly and rearwardly relative to the upper element 48, the base plate 36, and the lure body 12, between a perpendicular intermediate position, such as shown in Figures 1 and 4, and forwardly and rearwardly declining positions. For lending rigidity to the main waterfoil element and to provide mounting for two laterally spaced hinge barrels 78, is a relatively narrow vertically elongated strap 80 which is preferably a part continuous with the bottom of the notch 70, in the lower end of the main waterfoil element 64, as indicated at 82, and which is bent up along the forward side of the main element 64 and is secured thereto, as by solderings 84. The hinge barrels are on the upper end of the strap 80 and are spaced below the upper end of the main waterfoil element 64, and have securably extending therethrough and therebetween a hinge pin 86.

The waterfoil assembly 34 further comprises a resilient preferably spring wire combined guide and adjustment retaining assembly 88, which comprises an upper horizontally and longitudinally elongated and forwardly projecting guide rod 90 which is slidably engaged through the guide hole 42 in the arm 40; and a lower detent rod 92, which is horizontally and longitudinally elongated, is spaced below the guide rod 90, and extends forwardly and slidably through the detent hole 44 in the lower part of the arm 40. The detent rod 92 extends forwardly from the bottom end of a vertical helical coil 94 which terminates at its other end in a rearwardly extending rod portion 96 which, at its rear end is formed into a journal eye 98 which is journaled on the hinge pin 86 between the barrels 78. The guide rod 90 at its rear end is joined to an arcuate bend portion 100, which follows the contour of and is secured, as by soldering 102, to the upper side or top of the coil 94, and terminates in a straight portion 104 which eventuates at its rear end in the journal eye 98. The portion 104 overlies and is secured to the rod portion 96, as by soldering 106. In this arrangement, the coil 94 serves to tension the detent rod 92 downwardly and away from the guide rod 90, so as to assure secure engagement of any of longitudinally spaced detent notches 108 in the underside of the detent rod 92 with the lower edge 110 of the detent hole 44, as shown in Figure 4, whereby the main waterfoil element 64 is locked in a selected angular position. The engagement of the detent rod 92 with the arm 40 and the guide rod 90 and the guide hole 42 in the arm 40, and the tensioning of the rods relative thereto serve to stabilize the assembly 88, while making adjustments thereof, and while the lure is in use on a fishing line 62, since the guide rod 90 is maintained to frictional engagement with the guide hole 42, and the detent rod 92 is heavily tensioned against the lower edge 110 of the detent hole 44, so that the parts cannot slide or be jumped out of adjustment, by contacts of expected objects therewith in the water.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. An artifical lure comprising a longitudinally and horizontally elongated buoyant lure body having an underside and forward and rear ends, fishhook means secured to and depending from said underside near the forward end of the body, a waterfoil assembly fixed to said underside between the fishhook means and the rear end of the body, said assembly comprising a base plate fixed to said underside and having forward and rear ends, a right angular combined guide and detent arm fixed to and depending from said base plate at its forward end, a rearwardly declining upper waterfoil element fixed on said base plate at the rear end thereof and extending rearwardly beyond the base plate, said upper element having a rear edge, a horizontal rearwardly extending fishing line attaching lug on said rear edge, a depending main waterfoil element having upper and lower ends, first means horizontally hinging the upper end of the main waterfoil element to the rear edge of the upper waterfoil element, a resilient combined guide and detent assembly extending between said combined guide and detent arm and said main waterfoil element, said guide and detent assembly having a rear end, second means horizontally hinging the rear end of the guide and detent assembly to said main waterfoil element at a point near to and below the upper end thereof, said guide and detent assembly having an upper longitudinal guide rod slidably engaged with said arm and a lower longitudinal detent rod, said arm having a detent hole formed therethrough and said detent rod having longitudinally spaced notches therein which are selectively engageable with an edge of the detent hole, and spring means acting between said rods and urging said detent arm releasably into engagement with said detent edge.

2. An artificial lure according to claim 1, wherein said combined guide and detent arm has a guide hole through which said guide rod extends slidably and frictionally.

3. An artificial lure according to claim 1, wherein said upper waterfoil element is a flat rearwardly flaring plate which is wider than the lure body, and said main waterfoil element is a flat plate wider than said upper waterfoil element.

4. An artificial lure according to claim 1, wherein said upper waterfoil element is a flat rearwardly flaring plate which is wider than the lure body, and said main waterfoil element is a flat plate wider than said upper waterfoil element, and means reinforcing said main waterfoil plate and said second hinge means, comprising a strap secured on the forward side of the main waterfoil plate and having an upper end spaced below the upper end of the main waterfoil plate, said second hinge means being on the upper end of the strap.

5. An artificial lure according to claim 1, wherein said guide rod and said detent rod are in vertically spaced and substantially parallel relation to each other and spaced below said base plate, said detent rod having a rear end, said spring means being a coil spring having a first end secured to the rear end of the detent rod and a second end eventuating in an eye, said guide rod having an intermediate portion secured to said coil spring and a rear end eventuating in said eye, said second hinge means having a hinge pin on which said eye is journaled, and said coil spring acting to tension said detent rod downwardly away from the guide rod and into forcible engagement with said detent edge.

6. An artificial lure according to claim 1, wherein said guide rod and said detent rod are in vertically spaced and substantially parallel relation to each other and spaced below said base plate, said detent rod having a rear end, said spring means being a coil spring having a first end secured to the rear end of the detent rod and a second end eventuating in an eye, said guide rod having an intermediate portion secured to said coil spring and a rear end eventuating in said eye, said second hinge means having a hinge pin on which said eye is journaled, and said coil spring acting to tension said detent rod downwardly away from the guide rod and into forcible engagement with said detent edge, said guide and detent arm having an upper guide hole through which said guide rod extends and a lower detent hole through which said detent rod freely extends, said detent edge being at the lower end of the detent hole.

No references cited.